2,904,560
Patented Sept. 15, 1959

2,904,560

7-ACYLTHIO-4-PREGNENE-3,20-DIONES

Raymond M. Dodson, Park Ridge, and Robert C. Tweit, Wilmette, Ill., assignors to G. D. Searle & Co., Chicago, Ill., a corporation of Delaware No Drawing. Application May 2, 1958
Serial No. 732,453

11 Claims. (Cl. 260—397.3)

The present invention is concerned with 7α-acylthio substitution products of 4-pregnene-3,20-diones which can be represented by the general structural formula

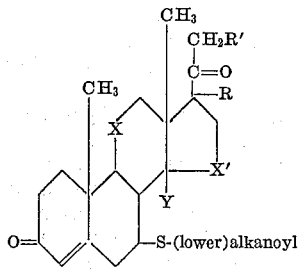

in which R and R' can represent hydrogen, hydroxyl and (lower)alkanoyloxy, X and X' can represent methylene, hydroxymethylene and carbonyl, Y can represent hydrogen and hydroxyl. Among the radicals comprehended by the expression ("lower)alkanoyl" are formyl, acetyl, propionyl, butyryl, valeryl, hexanoyl, heptanoyl, octanoyl and branched-chain isomers thereof, said alkanoyl radicals being the acyl radicals of alkanoic acids containing fewer than nine carbon atoms.

Compositions of the present invention can be prepared by the addition of a thioalkanoic acid of the structural formula

R"COSH in which R" represents hydrogen or a lower alkyl radical, to a 4,6-pregnadiene-3,20-dione which can be represented by the structural formula

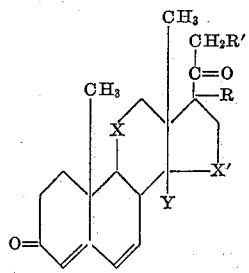

in which R, R', X, X', and Y have the meanings as aforesaid. The addition reaction proceeds fairly rapidly at elevated temperatures, such as those in excess of 50° and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100°. Heating periods of up to a few hours are sufficient to achieve substantial conversion to the desired reaction products. Typically, the desired compound is obtained in a satisfactory state of purity by direct filtration of the cooled reaction mixture, preceded, where necessary by removal of excess thioalkanoic acid. If desired, however, the reaction product can be purified by chromatographic techniques using adsorbents such as silica gel followed by elution with mixtures of ethyl acetate in benzene.

Since thioalkanoic acids are effective acylating agents, employment as a starting material of a 4,6-pregnadiene-3,20-dione having a free hydroxyl group at position 21 leads to the formation of a substantial amount of a 21-acyloxy derivative after a prolonged reaction time. In general, however, reaction products containing esterified hydroxyl groups are best prepared by using a starting material containing the desired esterified hydroxyl groups in position and then conducting the addition reaction of the thioalkanoic acid as set out hereinbelow. Alternatively, however, starting materials containing free hydroxyl groups can be subjected to the addition reaction of the thioalkanoic acid followed by esterification procedures known in the art such as by the use of the corresponding (lower)alkanoic acid anhydrides and pyridine.

The addition of thioalkanoic acids to the 6,7-double bond of the starting materials employed in the practice of this invention proceeds under steric influences such that of the stereoisomers formed, one is obtained in predominant amount, which, in each case, has been characterized herein as possessing the α-configuration of the 7-acylthio group. This configuration has been designated in order to provide a more complete exposition of the present invention, and in order that the specification shall constitute a more useful contribution to the art. However, the designated configuration of the 7-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The compounds of the present invention have useful pharmacological properties in consequence of their hormonal and anti-hormonal activities. They are anti-inflammatory agents of the cortisone type and progestational agents. They also inhibit the sodium retention characteristic of desoxycorticosterone. This application is a continuation-in-part of our application Serial No. 706,260, filed December 31, 1957, and now abandoned.

This invention will appear more fully from the examples which follow. These examples are set forth by way of illustration only and it will be understood that the invention is not to be construed as limited in spirit or in scope by the details contained therein, as many modifications in materials and in methods will be apparent from this disclosure to those skilled in the art. In these examples, temperatures are given in degrees centigrade (° C.) and quantities of materials are expressed in parts by weight and parts by volume which bear the same relation one to the other as kilograms to liters.

*Example 1*

A stainless steel fermentation tank having a capacity of about 40,000 volumes is charged with a solution of 1000 parts by weight of dextrose, 200 parts by weight of a commercial cotton seed meal flour, 90 parts by volume of corn steep liquor and 12 parts by volume of concentrated hydrochloric acid in 25,000 parts by volume of tap water. Five parts by weight of an anti-foaming agent, suitably of a silicone type, are added and the contents of the vessel are sterilized by the addition of live steam under pressure to a temperature of about 110° to 120° and a final volume of about 30,000 volumes. The contents of the fermentor are cooled and inoculated with a spore suspension of *Mucor hiemalis*-M1027. The contents of the fermentor are kept agitated by a stirrer operating at about 200 to 300 revolutions per minute. A stream of air which has been sterilized by passage through a glass wool filter is introduced through an inlet tube into the contents of the fermentor at a rate of from 20,000 to 35,000 volumes of air per minute. This rate of aeration is measured by means of a rotameter placed in the sterile portion of the air line. Growth of the microorganism is allowed to continue for 46 hours at a temperature of about 25°. During this period of incubation, additional small portions of anti-foam agent are added as necessary. A solution of 10 parts by weight of progesterone in 750 parts by volume of ethanol is added and fermentation in the presence of the steroid substrate is continued for an additional 20 hours at 25° with the same rates of stirring and aeration. The contents of the fermentor are stirred with 18,000 parts by volume of methylene chloride for one hour. The mycelium is then separated by filtration and washed with about twice its volume of methylene chloride. The methylene chloride extracts are combined and concentrated under reduced pressure to about 600 parts by volume, filtered and further concentrated to dryness. The residue is triturated with ether, followed by warm acetone-ether to remove the 6,14-isomer and the residue crystallized from methanol-acetone to yield 7α,14α-dihydroxyprogesterone, M.P. 234–238°.

A solution of 2 parts by weight of 7α,14α-dihydroxyprogesterone, 3 parts by weight of potassium hydroxide and 500 parts by volume of methanol is allowed to stand overnight. The reaction mixture is made neutral with acetic acid, concentrated in vacuo to 25 parts by volume, diluted with 100 parts by volume of water and the precipitate of 14α-hydroxy-4,6-pregnadiene-3,20-dione which forms recovered; melting point 177–178°.

A solution of 0.9 part by weight of 14α-hydroxy-4,6-pregnadiene-3,20-dione in 2 parts by volume of thioacetic acid is heated for 6 hours while irradiating with an ultraviolet light. The solution is allowed to stand overnight, diluted with 10 parts by volume of ether and 40 parts by volume of methylene chloride, washed with water followed by dilute sodium hydroxide solution and concentrated to dryness in vacuo. The residue is dissolved in 50 parts by volume of benzene and chromatographed on silica gel. The chromatographic column is eluted with 6000 parts by volume of 20% ethyl acetate in benzene, the solvent removed from the eluate, the residue collected and crystallized from acetone-ether to yield 7α-acetylthio-14α-hydroxy-4-pregnene-3,20-dione; melting point 188–191° (dec.); ultraviolet extinction coefficient 18,300 at 238.5 millimicrons.

*Example 2*

A solution of 2 parts of 17α-hydroxy-21-acetoxy-4,6-pregnadiene-3,11,20-trione in 2 parts of thioacetic acid is heated under reflux and irradiated with ultraviolet light for 2 hours. The solid product which results is collected on a filter and washed with ether. This product is dissolved in a minimum quantity of methylene chloride, and recrystallized by adding 20 parts of methanol and concentrating the resulting solution. The compound thus obtained is 7α-acetylthio-17α-hydroxy-21-acetoxy-4-pregnene-3,11,20-trione which melts at about 234–235°, has an ultraviolet absorption maximum at 235.5 millimicrons with a molecular extinction coefficient of about 16,850, and has a specific rotation of about +102.5° in chloroform solution. The structural formula is

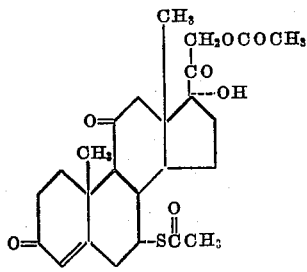

*Example 3*

A stainless steel fermentation tank having a capacity of about 400,000 volumes is charged with a solution prepared by boiling 1200 parts by weight of a commercial cotton seed meal flour, 500 parts by volume of corn steep liquor and 50 parts by volume of concentrated hydrochloric acid in about 20,000 parts by volume of tap water. The resulting solution is cooled and filtered. Five thousand parts by weight of dextrose and 10 parts by weight of an anti-foam agent, suitably of a silicone type, are added and the volume is brought up to 180,000 volumes in the fermentor. The contents of the vessel are sterilized by the addition of live steam under pressure to a temperature of about 110° to 120°. The contents of the fermentor are cooled and inoculated with a spore suspension of Penicillium sp., ATCC 12,556. The contents of the fermentor are kept agitated by a stirrer operating at about 150 revolutions per minute and a stream of air sterilized by passage through a glass wool filter is introduced into the medium through an inlet tube at the rate of from 40,000 to 50,000 volumes of air per minute. This rate of aeration is measured by means of a rotameter placed in the sterile portion of the air line. Growth of the microorganism is allowed to continue for 52.5 hours at a temperature of about 25°. During this period, additional amounts of anti-foam agent are added as required. A solution of 50 parts by weight of progesterone in 1500 parts by volume of ethanol is added and fermentation in the presence of the steroid substrate is continued for an additional 13 hours. The mycelium is separated by filtration in a basket type centrifuge and washed with about twice its volume of methylene chloride. The aqueous filtrate is extracted twice by stirring with approximately 100,000 parts by volume portions of methylene chloride. The methylene chloride extracts are combined and reduced to about 8000 volumes by distillation of the solvent at atmospheric pressure. The concentrate is filtered and reduced to about 670 volumes by distillation at atmospheric pressure and then in vacuo to dryness. The residue is triturated with petroleum ether, ether and acetone and the residue is crystallized from acetone.

A solution of 2 parts by weight of this residue and 2 parts by weight of sodium hydroxide in 500 parts by volume of methanol is allowed to stand for 60 hours. The reaction mixture is made neutral with 3 parts by volume of acetic acid and concentrated in vacuo. The residue is diluted with water and the solid collected and crystallized from acetone to yield 15β-hydroxy-4,6-pregnadiene-3,20-dione; melting point 214–216°; ultraviolet extinction coefficient 26,300 at 284 millimicrons.

A mixture of 0.5 part by weight of 15β-hydroxy-4,6-pregnadiene-3,20-dione and 0.5 part by volume of thioacetic acid is heated for one-half hour while being irradiated with an ultraviolet light. Another 0.5 part by volume of thioacetic acid is added and heating continued for a total of 1.5 hours. After standing overnight the solution is poured into water, neutralized with sodium bicarbonate and extracted several times with 25 parts by volume portions of methylene chloride. The extracts are combined, dried over magnesium sulfate, decanted from the drying agent and concentrated to dryness. The residue is collected, dissolved in 50 parts by volume of benzene and the solution chromatographed on 20 parts by weight of silica gel. The column is eluted with 250 parts by volume of 30% ethyl acetate in benzene, the eluate evaporated to dryness and the residue crystallized from acetone-ether to yield 7α-acetylthio-15β-hydroxy-4-pregnene-3,20-dione; melting point 218–221° (dec.); ultraviolet extinction coefficient 21,000 at 238 millimicrons.

*Example 4*

A mixture of 1.5 parts by weight of 4,6-pregnadiene-3,20-dione and 1.5 parts by volume of thiopropionic acid is heated on the steam bath for 3 hours. After standing overnight, the reaction mixture is diluted with 25 parts by volume of ether and the crystals which form on cooling are separated and recrystallized from acetone-ether to yield 7α-propionylthioprogesterone; melting point 134–136°; [α]$_D$=+7.6°; ultraviolet extinction coefficient 17,700 at 238 millimicrons.

Example 5

A mixture of 1.5 parts by weight of 21-acetoxy-17α-hydroxy-4,6-pregnadiene-3,20-dione and 1.5 parts by volume of thioacetic acid is heated for 2 hours. The reaction mixture is concentrated under a nitrogen atmosphere to 2 parts by volume. The crystals which form on standing are collected, washed with ether and recrystallized from methylene chloride-acetone to yield 21-acetoxy-17α-hydroxy-7α-acetylthio-4-pregnene-3,20-dione; melting point 211–213° (dec.); [α]$_D$=+3°; ultraviolet extinction coefficient 20,300 at 238 millimicrons.

Example 6

A mixture of 1.1 parts by weight of 21-acetoxy-11β,17α-dihydroxy-4,6-pregnadiene-3,20-dione and 1.1 parts by volume of thioacetic acid is heated for one-half hour on the steam bath. After standing at room temperature overnight, the reaction mixture is concentrated in vacuo to 1.5 parts by volume and then diluted with ether. The solid which forms is collected and recrystallized from acetone to yield 21-acetoxy-7α-acetylthio-11β,17α-dihydroxy-4-pregnene-3,20-dione; melting point 181–182° (dec.); [α]$_D$=+50.5°; ultraviolet extinction coefficient 17,900 at 238.5 millimicrons.

Example 7

A mixture of 1.1 parts by weight of 21-acetoxy-4,6-pregnadiene-3,20-dione and 1 part by volume of thiopropionic acid is heated on the steam bath for 3 hours. The reaction mixture is concentrated in vacuo to 1.5 parts by volume, cooled and diluted with ether. The crystalline residue which forms is collected and recrystallized from acetone-ether to yield 21-acetoxy-7α-propionylthio-4-pregnene-3,20-dione; melting point 92–96°; [α]$_D$=+27.6°; ultraviolet extinction coefficient 17,800 at 238 millimicrons.

Example 8

A mixture of 2 parts by weight of 17α-hydroxy-4,6-pregnadiene-3,20-dione and 2 parts by volume of thioacetic acid is heated on the steam bath for 3 hours. The reaction mixture is cooled, stirred and diluted with 20 parts by volume of ether. The solid residue which separates is collected and washed with ether to yield 7α-acetylthio-17α-hydroxy-4-pregnene-3,20-dione; melting point 227–229° (dec.); [α]$_D$=−38°; ultraviolet extinction coefficient 19,200 at 238.5 millimicrons.

Example 9

A solution of 10 parts by weight of 4-pregnene-3,11,20-trione and 10 parts by weight of chloranil in 1000 parts by volume of xylene is refluxed for 2 hours. The reaction mixture is cooled and chromatographed over 600 parts by weight of silica gel. The chromatographic column is washed successively with 6000 parts by volume portions of benzene, 10% ethyl acetate in benzene and 20% ethyl acetate in benzene and eluted with 10,000 parts by volume of 30% ethyl acetate in benzene. The solvent is removed from the eluate in vacuo and the residue which remains is crystallized from acetone-petroleum ether to yield 4,6-pregnadiene-3,11,20-trione; melting point 152–154°; [α]$_D$=+269.5°; ultraviolet extinction coefficient 24,300 at 281 millimicrons.

A mixture of 0.8 part by weight of 4,6-pregnadiene-3,11,20-trione and 1 part by volume of thiopropionic acid is heated for 3 hours on the steam bath. The reaction mixture is concentrated in vacuo and the crystalline residue thus obtained is recrystallized from acetone to yield 7α-propionylthio-4-pregnene-3,11,20-trione; melting point 153–155°; [α]$_D$=+95.4°; ultraviolet extinction coefficient 18,000 at 236 millimicrons.

Example 10

A mixture of 1.13 parts by weight of 17α-hydroxy-4,6-pregnadiene-3,20-dione, 1.5 parts by volume of propionic anhydride, 0.2 part by weight of p-toluenesulfonic acid monohydrate and 25 parts by volume of benzene is heated on the steam bath and allowed to stand for 4 days at room temperature. The reaction mixture is poured into water, the benzene layer is separated, washed with sodium bicarbonate solution and concentrated in vacuo. The oily residue is triturated with 10 parts by volume of ether and the solid which forms is collected to yield 17α-propionoxy-4,6-pregnadiene-3,20-dione; melting point 170–172°.

The 17α-propionoxy-4,6-pregnadiene-3,20-dione obtained above is mixed with 0.7 part by volume of thioacetic acid, warmed on the steam bath for 2 hours, cooled, diluted with 20 parts by volume of ether and the crystalline residue thus formed is collected and washed with ether to yield 7α-acetylthio-17α-propionoxy-4-pregnene-3,20-dione; melting point 209–211° (dec.); [α]$_D$=−46.1°; ultraviolet extinction coefficient 19,500 at 238 millimicrons.

Example 11

A solution of 1 part by weight of 11β,17α-dihydroxyprogesterone, 1 part by weight of chloranil and a trace of p-toluenesulfonic acid monohydrate in 125 parts by volume of xylene is refluxed for 48 hours, cooled and chromatographed over silica gel. The chromatographic column is washed successively with 2000 parts by volume portions of 5% ethyl acetate in benzene, 10% ethyl acetate in benzene, and 15% ethyl acetate in benzene and then eluted with 10,000 parts by volume of 20% ethyl acetate in benzene. The solvent is removed from the eluate and the residue collected to yield 11β,17α-dihydroxy-4,6-pregnadiene-3,20-dione; ultraviolet maximum at 283 millimicrons.

A mixture of 0.7 part by weight of 11β,17α-dihydroxy-4,6-pregnadiene-3,20-dione and 1 part by volume of thioacetic acid is heated for 1 hour on the steam bath. The reaction mixture is evaporated in vacuo, the residue dissolved in 50 parts by volume of benzene and chromatographed on silica gel. The column is washed successively with 2000 parts by volume portions of benzene, 5%, 10% and 15% ethyl acetate in benzene, and eluted with 10,000 parts by volume of 20% ethyl acetate in benzene. The eluate is evaporated to dryness in vacuo. The residue is crystallized from acetone-ether to yield 7α-acetylthio-11β,17α-dihydroxy-4-pregnene-3,20-dione; M.P. 233–236° (dec.); ultraviolet extinction coefficient 19,600 at 238 millimicrons.

Example 12

A mixture of 1 part by weight of 17α,21-dihydroxy-4,6-pregnadiene-3,11,20-trione and 1 part by volume of 3-methylbutanethiolic acid is heated for 20 minutes on the steam bath. Then the excess thiolic acid is removed in vacuo, the residue dissolved in 100 parts by volume of benzene and chromatographed on silica gel. The column is washed successively with 6000 parts by volume portions of benzene, 5% ethyl acetate in benzene, 10% ethyl acetate in benzene, and 25% ethyl acetate in benzene and the product is eluted with 8000 parts by volume of 40% ethyl acetate in benzene. The solvents are removed from the eluate to yield 17α,21-dihydroxy-7α-(3-methylbutyrylthio)-4-pregnene-3,11,20-trione as a glass. The compound has a maximum in the ultraviolet absorption spectrum at 235 millimicrons and infrared absorption maxima at 2.9, 5.8, 5.9 and 6.2 microns.

Example 13

A mixture of 1 part by weight of 17α,21-dihydroxy-7α-(3-methylbutyrylthio)-4-pregnene-3,11,20-trione, 4 parts by volume of isobutyric anhydride and 8 parts by volume of pyridine is warmed on the steam bath until homogeneous. The solution is allowed to stand overnight and then is diluted with water and extracted with methylene chloride. The methylene chloride solution is washed with sodium carbonate solution and then concentrated in vacuo. The residue is dissolved in 50 parts by volume of benzene and chromatographed on silica gel. The chromatographic column is washed successively with 1000 parts by volume portions of benzene, 5% ethyl acetate in benzene and 10% ethyl acetate in benzene. The product is eluted with 2000 parts by volume of 20% ethyl acetate in benzene. The solvents are removed from the eluate, leaving 17α-hydroxy-21-isobutyroxy - 7α - (3-methylbutyrylthio)-4-pregnene-3,11,20-trione. The compound has a maximum in the ultraviolet absorption spectrum at 235 millimicrons and infrared absorption maxima at 2.9, 5.8, 5.9, 6.0 and 6.2 microns.

*Example 14*

A solution of 3 parts by weight of 15β-hydroxy-4,6-pregnadiene-3,20-dione and 40 parts by volume of pyridine is added to a mixture of 3 parts by weight of chromium trioxide in 30 parts by volume of pyridine. The resulting dark mixture is allowed to stand 24 hours, diluted with 400 parts by volume of water, and filtered through diatomaceous earth. The residue and filtrate are both extracted three times with a total of 500 parts by volume of 1:1 ether:benzene. The combined extracts are washed with water and concentrated to dryness in vacuo to yield 4,6-pregnadiene-3,15,20-trione which melts at 197–199° after crystallization from acetone.

A mixture of one part by weight of 4,6-pregnadiene-3,15,20-trione and one part by volume of thioacetic acid is heated on the steam bath for one and one-half hours. The excess thioacetic acid is removed in vacuo, ether is added and on scratching a solid forms which is recrystallized from acetone-ether to yield 7α-acetylthio-4-pregnene-3,15,20-trione melting at 187–189°.

*Example 15*

A mixture of one part by weight of 11α-hydroxy-4,6-pregnadiene-3,20-dione and one part by volume of thioacetic acid is heated on the steam bath for 20 minutes. The resulting solution is diluted with 50 parts by volume of benzene and chromatographed on 50 parts by weight of silica gel. The chromatographic column is washed with 1000 parts by volume portions of benzene, 10% acetate in benzene, and 20% ethyl acetate in benzene. Then the column is eluted with 200 parts by volume of 50% ethyl acetate in benzene. The solvent is removed from the eluate in vacuo to yield 7α-acetylthio-11α-hydroxy-4-pregnene,-3,20-dione which exhibits absorption maxima in the ultraviolet absorption spectrum at 238 millimicrons and in the infrared absorption spectrum at 2.9, 5.9, 6.0, 6.2, 8.8 and 9.1 microns.

*Example 16*

A solution of 5 parts by weight of 15α-hydroxy-progesterone, 5 parts by weight of chloranil and 0.1 part by weight of p-toluenesulfonic acid monohydrate in 500 parts by volume of xylene is refluxed for 3 hours. The reaction mixture is chromatographed on 250 parts by weight of silica gel and the chromatographic column washed successively with 3000 parts by volume portions of benzene, 10% ethyl acetate in benzene and 25% ethyl acetate in benzene. Then the column is eluted with 6000 parts by volume of 40% ethyl acetate in benzene and the solvent removed from the eluate in vacuo to yield 15α-hydroxy-4,6-pregnadiene-3,20-dione which exhibits absorption maxima in the ultraviolet absorption spectrum at 2.9, 5.85, 6.0, 6.2 and 6.3 microns.

A mixture of 2 parts by weight of 15α-hydroxy-4,6-pregnadiene-3,20-dione and 2 parts by volume of thiopropionic acid is heated on the steam bath for 15 minutes. The resulting solution is diluted with 50 parts by volume of benzene and chromatographed on 120 parts by weight of silica gel. The chromatographic column is washed successively with 2500 parts by volume portions of benzene, 10% ethyl acetate in benzene and 20% ethyl acetate in benzene. The column is eluted with 5000 parts by volume of 40% ethyl acetate in benzene and the solvent removed from the eluate in vacuo to yield 7α-propionylthio-15α-hydroxy-4-pregnene-3,20-dione which exhibits absorption maxima in the ultraviolet absorption spectrum at 238 millimicrons and in the infrared absorption spectrum at 2.9, 5.9, 6.0, 6.2 and 10.7 microns.

What is claimed is:
1. A compound of the formula

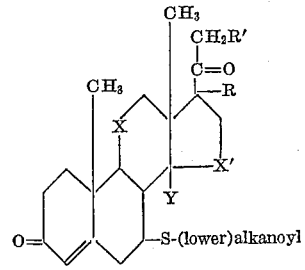

in which R and R' are selected from the group consisting of hydrogen, hydroxyl and (lower)alkanoyloxy, X and X' are selected from the group consisting of methylene, hydroxymethylene and carbonyl, and Y is hydrogen when X' is oxygenated and selected from the group consisting of hydrogen and hydroxyl when X' is methylene.

2. 21 - acetoxy - 7 - acetylthio - 17α - hydroxy - 4-pregnene-3,11,20-trione.

3. 7 - acetylthio - 15 - hydroxy - 4 - pregnene - 3,20-dione.

4. 7-propionylthioprogesterone.

5. 21 - acetoxy - 7 - acetylthio - 17α - hydroxy - 4-pregnene-3,20-dione.

6. 21 - acetoxy - 7 - acetylthio - 11,17α - dihydroxy-4-pregnene-3,20-dione.

7. 21 - acetoxy - 7 - propionylthio - 4 - pregnene-3,20-dione.

8. 7 - acetylthio - 17α - hydroxy - 4 - pregnene - 3,20-dione.

9. 7-propionylthio-4-pregnene-3,11-20-trione.

10. 7 - acetylthio - 17α - propionoxy - 4 - pregnene-3,20-dione.

11. 7α-acetylthio-4-pregnene-3,15,20-trione.

No references cited.

UNITED STATES PATENT OFFICE
CERTIFICATE OF CORRECTION

Patent No. 2,904,560                                                    September 15, 1959

Raymond M. Dodson et al.

It is hereby certified that error appears in the printed specification of the above numbered patent requiring correction and that the said Letters Patent should read as corrected below.

Column 7, lines 48 and 49, for "10% acetate" read -- 10% ethyl acetate --; line 50, for "200 parts" read -- 2000 parts --; column 8, line 9, after "at" insert -- 283 millimicrons and in the infrared absorption spectrum at --.

Signed and sealed this 29th day of March 1960.

(SEAL)
Attest:

KARL H. AXLINE                                             ROBERT C. WATSON
Attesting Officer                                          Commissioner of Patents